United States Patent
Hoshino et al.

(10) Patent No.: US 8,947,335 B2
(45) Date of Patent: Feb. 3, 2015

(54) METHOD OF DRIVING BI-STABLE LIQUID CRYSTAL PANEL AND DRIVING DEVICE

(75) Inventors: Masafumi Hoshino, Chiba (JP); Hisayuki Hirayama, Chiba (JP)

(73) Assignee: Seiko Instruments Inc. (JP)

( * ) Notice: Subject to any disclaimer, the term of this patent is extended or adjusted under 35 U.S.C. 154(b) by 133 days.

(21) Appl. No.: 13/703,921

(22) PCT Filed: Apr. 21, 2011

(86) PCT No.: PCT/JP2011/059774
§ 371 (c)(1),
(2), (4) Date: Mar. 5, 2013

(87) PCT Pub. No.: WO2011/158552
PCT Pub. Date: Dec. 22, 2011

(65) Prior Publication Data
US 2013/0169898 A1    Jul. 4, 2013

(30) Foreign Application Priority Data

Jun. 18, 2010  (JP) ................................. 2010-139768

(51) Int. Cl.
*G09G 3/36* (2006.01)
*G09G 5/10* (2006.01)
*G02F 1/133* (2006.01)

(52) U.S. Cl.
CPC .......... *G02F 1/13306* (2013.01); *G09G 3/3622* (2013.01)
USPC ............................................ 345/97; 345/691

(58) Field of Classification Search
CPC ... G09G 3/36; G09G 3/34; G09G 2300/0486; G09G 3/3651; G09G 3/3629; G02F 1/1391; G02F 1/13718; G02F 1/167
See application file for complete search history.

(56) References Cited

U.S. PATENT DOCUMENTS 6,278,429 B1 * 8/2001 Ruth et al. ...................... 345/94
7,773,064 B2 * 8/2010 Doane et al. .................... 345/87

FOREIGN PATENT DOCUMENTS

| AM | 07129134 | 5/1995 |
| JP | 2004004552 | 1/2004 |

OTHER PUBLICATIONS

US Office Action mailed Apr. 21, 2014 issued in U.S. Appl. No. 13/138,718.

* cited by examiner

*Primary Examiner* — Michael Faragalla
(74) *Attorney, Agent, or Firm* — Adams & Wilks

(57) ABSTRACT

In method of driving a bistable nematic dot-matrix liquid crystal display panel, a first pulse voltage is applied to nematic liquid crystal molecules to raise the nematic liquid crystal molecules in the longitudinal direction. After application of the first pulse voltage, a second pulse voltage is applied to the nematic liquid crystal molecules for selecting one of two stable orientation states of the nematic liquid crystal molecules. Immediately after the application of the second pulse voltage, an AC pulse waveform of a voltage lower than a last pulse of the second pulse voltage is applied to thereby remove residual electric charges remaining in the bistable nematic dot-matrix liquid crystal display panel.

13 Claims, 10 Drawing Sheets

TRUTH TABLE
SEG-Drv.

| S-Data | FR | DispOffx | Output |
|--------|----|----------|--------|
| 0 | 0 | 1 | V34 |
| 1 | 0 | 1 | V5 |
| 0 | 1 | 1 | V12 |
| 1 | 1 | 1 | V0 |
| X | X | 0 | V5 |

TRUTH TABLE
COM-Drv.

| CCX | C-Data | FR | DispOffx |
|---|---|---|---|
| 0 | 0 | 0 | 1 |
| 0 | 0 | 1 | 1 |
| 0 | 1 | 0 | 1 |
| 0 | 1 | 1 | 1 |
| 1 | 0 | 0 | 1 |
| 1 | 0 | 1 | 1 |
| 1 | 1 | 0 | 1 |
| 1 | 1 | 1 | 1 |
| X | X | X | 0 |

| Mode-C | Mode-D |
|---|---|
| V5 | V5 |
| V12 | V12 |
| V12 | V12 |
| V5 | V5 |
| V12 | don't care |
| don't care | V12 |
| VCX | VCX |
| V5 | V5 |

| Mode-F | Mode-G | Mode-H |
|---|---|---|
| V34 | V5 | V34 |
| V12 | V0 | V12 |
| V12 | V0 | V12 |
| V34 | V5 | V34 |
| V34 | don't care | don't care |
| don't care | V0 | V12 |
| VCX | VCX | don't care |
| don't care | V5 | VCX |
| V5 | V5 | V5 |

Fig. 7

METHOD OF DRIVING BI-STABLE LIQUID CRYSTAL PANEL AND DRIVING DEVICE

BACKGROUND OF THE INVENTION

1. Technical Field

The present invention relates to a method and a device for driving a bistable liquid crystal display panel, and more particularly, to a method and a device for driving a bistable nematic dot-matrix liquid crystal display panel.

2. Background Art

FIG. 1 is a general functional block diagram for controlling display of a bistable liquid crystal display panel 10. The bistable liquid crystal display panel 10 is driven by a driving device including a common driving section (COM-IC) 11 for driving common lines in the horizontal direction, a segment driving section (SEG-IC) 12 for driving segment lines in the vertical direction, a power supply circuit 13 for generating drive potentials (V0, V12, V34, V5, and VCX), and a control section (MPU) 14 for controlling the common driving section 11, the segment driving section 12, and the power supply circuit 13.

Signals and functions of the control section 14 for controlling the common driving section 11 and the segment driving section 12 are the same as those in a normal STN driver circuit. For the common driving section 11, there are prepared an initialization signal RESETX, C-data for determining scan timing, a writing clock CL, an alternating current signal FRCOM, and DispOffx for display erasing. For the segment driving section 12, there are prepared the initialization signal RESETX, S-data for providing display image data, a writing clock XCK, an alternating current signal FRSEG, and DispOffx for display erasing.

FIG. 2 is an explanatory diagram of switching between the states of bistable nematic liquid crystal, illustrating how to switch the twist direction of nematic liquid crystal molecules to two kinds of states, called twisted state (Twisted) and uniform state (Uniform), by applying specific signals to commons and segments of the bistable liquid crystal display panel 10.

Note that, in the drawings attached to this application, COM represents a common signal applied to a common electrode, COM-Scan represents a common signal at the time of selection, that is, a selection signal, COM-No Scan represents a common signal at the time of non-selection, that is, a non-selection signal, SEG represents a segment signal applied to a segment electrode, and COM-SEG represents a common-segment voltage, that is, a display voltage applied to an intersection pixel sandwiched by the common electrode and the segment electrode. Then, the above-mentioned write signal is divided into two kinds of signals, a white write signal and a black write signal, and the above-mentioned display signal is divided into two kinds of voltages, a white display voltage and a black display voltage.

In the beginning, the case of displaying white (White) at an intersection pixel between the common electrode and the segment electrode of the bistable liquid crystal display panel 10 is described. As illustrated in the uppermost stage on the left side of FIG. 2, the voltage waveform of the selection signal applied to the common terminal is a waveform which has the level of 0 for a first time interval "a" of a selection period T, a negative level −V for time intervals "b" and "c", a positive level +V for subsequent time intervals "d" and "e", a positive level +VCX(=+V−v) for a subsequent time interval "f", and the level of 0 for a remaining time interval "g".

As illustrated in the second stage on the left side of FIG. 2, the voltage waveform of the white write signal applied to the segment terminal is a waveform which has the level of 0 for the first time intervals "a" to "e" of the selection period T, a negative level −v for the subsequent time interval "f", and the level of 0 for the remaining time interval "g".

When such time-varying selection signal and time-varying white write signal as described above are applied, the waveform of the white display voltage, which is a voltage difference between the common terminal and the segment terminal, becomes a time-varying waveform. That is, as illustrated in the third stage on the left side of FIG. 2, the waveform of the white display voltage is a waveform which has the level of 0 for the first time interval "a" of the selection period T, the negative level −V for the subsequent time intervals "b" and "c", the positive level +V for the subsequent time intervals "d" to "e", and the level of 0 for the remaining time interval "g". This way, the waveform of the white display voltage shows a voltage transition between the negative level −V volts and the positive level +V.

The reason why the white display voltage having such waveform as described above is applied to the nematic liquid crystal is as follows. First, a stable state of orientation of the nematic liquid crystal molecules is broken by the voltage having the negative level −V to raise the nematic liquid crystal molecules in the longitudinal direction (see the schematic diagram on the left in the lowermost stage on the left side of FIG. 2). After that, the voltage having the positive level +V is released to the voltage having the level of 0 to lay the nematic liquid crystal molecules in an alignment direction (see the schematic diagram on the right in the lowermost stage on the left side of FIG. 2), to thereby set the twisted state (Twisted). This way, the intersection pixel of the bistable liquid crystal display panel 10 applied with the white display voltage having the waveform illustrated in the third stage on the left side of FIG. 2 displays white.

Next, the case of displaying black at the intersection pixel between the common electrode and the segment electrode of the bistable liquid crystal display panel 10 is described. The voltage waveform of the selection signal applied to the common terminal is identical to the waveform illustrated in the uppermost stage on the left side of FIG. 2.

As illustrated in the second stage on the right side of FIG. 2, the voltage waveform of the black write signal is a waveform which has the level of 0 for the first time intervals "a" to "c" of the selection period T, the negative level −v for the subsequent time interval "d", and the level of 0 for the remaining time intervals "e" to "g".

When such time-varying selection signal and time-varying black write signal as described above are applied, the waveform of the black display voltage, which is a voltage difference between the common terminal and the segment terminal, becomes a time-varying waveform. That is, as illustrated in the third stage on the right side of FIG. 2, the waveform of the black display voltage is a waveform which has the level of 0 for the first time interval "a" of the selection period T, the negative level −V for the subsequent time intervals "b" and "c", a positive level +(V+v) for the subsequent time interval "d", the positive level +V for the subsequent time interval "e", the positive level +VCX(=+V−v) for the subsequent time interval "f", and the level of 0 for the remaining time interval "g". This way, the black display voltage shows a voltage transition between −V and +(V+v).

The reason why the black display voltage having such waveform as described above is applied to the nematic liquid crystal is as follows. First, a stable state of orientation of the nematic liquid crystal molecules is broken by the voltage having the negative level −V to raise the nematic liquid crystal molecules in the longitudinal direction (see the schematic diagram on the left in the lowermost stage on the right side of FIG. 2). After that, the positive level +(V+v) is sequentially reduced in stages so that the positive level +(V+v) is reduced to the positive level +V, the positive level +V is reduced to the positive level +VCX(=+V−v), and at the end, the positive level +VCX(=+V−v) is reduced to the level of 0 so as to align the nematic liquid crystal molecules in substantially parallel (see the schematic diagram on the right in the lowermost stage on the right side of FIG. 2), to thereby set the uniform state (Uniform). This way, the intersection pixel of the bistable liquid crystal display panel 10 applied with the black display voltage illustrated in the third stage on the right side of FIG. 2 displays black.

FIG. 3 illustrates exemplary voltage waveforms applied to the common terminals and the segment terminal of the bistable liquid crystal display panel 10. The left side of FIG. 3 schematically illustrates a part of the bistable liquid crystal display panel 10 including common terminals in three successive rows, that is, an n-th row common terminal COM[n], an (n+1)th row common terminal COM[n+1], and an (n+2)th row common terminal COM[n+2], and segment terminals in three columns intersecting the three rows, that is, an m-th segment terminal SEG[m], an (m+1)th segment terminal SEG[m+1], and an (m+2)th segment terminal SEG[m+2].

Further, the right side of FIG. 3 illustrates voltage waveforms with the passage of time applied to the common terminals COM[n], COM[n+1], and COM[n+2] in the three successive rows and to the m-th segment terminal SEG[m] intersecting the common terminals of the bistable liquid crystal display panel 10. Note that, portions encircled by the broken lines are voltage waveforms of selection signals.

A voltage waveform of the selection signal applied to each of the common terminals at the time of selection (Scan) is, as illustrated in each of the first stage to the third stage from the top on the right side of FIG. 3, a waveform which has the level of 0 for the first time interval "a" of the selection period T, a positive level +V3 for the subsequent time interval "b", the level of 0 for subsequent time intervals "c" and "d", a positive level +V2 for the subsequent time interval "e", and the level of 0 for the time interval "f". Note that, V3>V2.

A voltage waveform of a non-selection signal applied to each of the common terminals at the time of non-selection is, as illustrated in each of the first stage to the third stage from the top on the right side of FIG. 3, a waveform which has the level of 0 for the first time intervals "a" and "b" of the selection period T, the positive level +V3 for the subsequent time intervals "c" to "e", and the level of 0 for the remaining time interval "f".

The voltage waveform of the signal applied to the common terminal is significantly different between FIGS. 2 and 3. That is, the voltage waveform of the selection signal illustrated in FIG. 2 is a voltage waveform showing a significant change to the positive and negative, but the voltage waveform of the selection signal illustrated in FIG. 3 is a waveform showing a significant change to only the positive side. Note that, although the non-selection signal is not illustrated in FIG. 2, the non-selection signal illustrated in FIG. 3 also has a waveform showing a significant change to only the positive side.

As illustrated in the first stage from the top on the right side of FIG. 3, the n-th row common terminal COM[n] is applied with the selection signal for a scan time section t1 and the non-selection signals for scan time sections t2 and t3. As illustrated in the second stage from the top on the right side of FIG. 3, the subsequent (n+1)th row common terminal COM[n+1] is applied with the non-selection signal for the scan time section t1, the selection signal for the scan time section t2, and the non-selection signal for the scan time section t3. As illustrated in the third stage from the top on the right side of FIG. 3, the subsequent (n+2)th row common terminal COM[n+2] is applied with the non-selection signals for the scan time sections t1 and t2 and the selection signal for the scan time section t3.

A voltage waveform of a segment voltage applied to the segment terminal, that is, the white write signal and the black write signal, is illustrated in the fourth stage from the top on the right side of FIG. 3. In this case, the white write signal is applied for the scan time section t1, the black write signal is applied for the scan time section t2, and the white write signal is applied for the scan time section t3.

The voltage waveform of the white write signal is a waveform which has the level of 0 for the first time intervals "a" and "b" of the selection period T, the positive level +V3 for the subsequent time intervals "c" and "d", a positive level +V4 for the subsequent time interval "e", and the level of 0 for the remaining time interval "f".

Further, the voltage waveform of the black write signal is a waveform which has the level of 0 for the first time intervals "a" and "b" of the selection period T, the positive level +V4 for the subsequent time interval "c", the positive level +V3 for the subsequent time intervals "d" and "e", and the level of 0 for the remaining time interval "f".

When the selection signal or the non-selection signal is applied to the common terminals and the white write signal or the black write signal is applied to the segment terminal as described above, common-segment voltages between the common terminals and the segment terminal, that is, the white display voltage and the black display voltage, as illustrated in the first stage to the third stage from the bottom on the right side of FIG. 3, are obtained.

That is, as illustrated in the third stage from the bottom on the right side of FIG. 3, an intersection pixel between the n-th row common terminal COM[n] and the m-th segment terminal SEG[m] in the scan time section t1 is applied with a white display voltage of a waveform which has the level of 0 for the first time interval "a" of the selection period T, the positive level +V3 for the subsequent time interval "b", a negative level −V3 for the subsequent time intervals "c" and "d", a negative level −(V4−V2) for the subsequent time interval "e", and the level of 0 for the remaining time interval "f".

In the scan time section t2, the intersection pixel is applied with a first parasite signal of a voltage waveform which has the level of 0 for the first time intervals "a" and "b" of the selection period T, a negative level −V1 for the subsequent time interval "c", and the level of 0 for the remaining time intervals "d" to "f". Further, in the scan time section t3, the intersection pixel is applied with a second parasite signal of a voltage waveform which has the level of 0 for the first time intervals "a" to "d" of the selection period T, the negative level −V1 for the subsequent time interval "e", and the level of 0 for the remaining time interval "f".

Next, as illustrated in the second stage from the bottom on the right side of FIG. 3, an intersection pixel between the (n+1)th row common terminal COM[n+1] and the m-th segment terminal SEG[m] is applied with the second parasite signal in the scan time section t1, a black display voltage in the scan time section t2, and the first parasite signal in the scan time section t3. The black display voltage is a voltage of a waveform which has the level of 0 for the first time interval "a" of the selection period T, the positive level +V3 for the subsequent time interval "b", the negative level −V4 for the subsequent time interval "c", the negative level −V3 for the subsequent time interval "d", a negative level −(V3−V2) for the subsequent time interval "e", and the level of 0 for the remaining time interval "f".

Further, as illustrated in the first stage from the bottom on the right side of FIG. 3, an intersection pixel between the (n+2)th row common terminal COM[n+2] and the m-th segment terminal SEG[m] is applied with the first parasite signal in the scan time section t1, the second parasite signal in the scan time section t2, and the white display voltage in the scan time section t3.

As described above, with regard to display on the bistable liquid crystal display panel 10, black/white for one line is determined by a signal state of one common which outputs a voltage waveform of a selection signal and signal states of all the segments, and by sequentially scanning all the commons for one frame, display for the whole screen is determined. Only one common of the whole screen is scanned at a moment, and the remaining majority of commons output a voltage waveform of a non-selection signal. When the amount of charges to be charged or discharged in the bistable liquid crystal display panel is considered, it is necessary to focus on a potential difference between the voltage of the non-selection signal, which is output by the majority of the commons, and the voltage of the white write signal or the black write signal applied to the segment terminals. Specifically, the parasite signal in the waveform of the common-segment voltage between the common terminal and the segment terminal greatly contributes to the amount of charges to be charged or discharged in driving the bistable liquid crystal display panel 10, and thereby affects the amount of current consumption.

FIG. 4 illustrates waveforms in a specific drive mode (Mode-C) of the bistable liquid crystal display panel 10. Four kinds of waveforms applied to the bistable liquid crystal display panel 10 are: the selection signal applied to the common terminal at the time of selection; the non-selection signal applied to the common terminal at the time of non-selection; the white write signal applied to the segment terminal; and the black write signal applied to the segment terminal. Their voltage waveforms are the same as those illustrated in FIG. 3.

FIG. 4 also illustrates four kinds of voltages applied to the intersection pixel between the common terminal and the segment terminal, that is, the white display voltage, the black display voltage, a first parasite signal 40, and a second parasite signal 40. Their voltage waveforms are the same as those illustrated in FIG. 3. Further, the actual voltage value and pulse width have temperature properties in which, as the temperature becomes low, the voltage rises and the pulse width becomes larger.

Numerals "1" and "0" illustrated on the lower side of FIG. 4 indicate control signals for the waveform of a common voltage applied to the common terminal and the waveform of a segment voltage applied to the segment terminal. The waveform of the common voltage is controlled based on four signals CCX, C-Data, FR, and DispOffx. The waveform of the segment voltage is controlled based on three signals S-Data, FR, and DispOffx. When a driver (not employing SA driving system) which is already commercially available and normally drives a general STN liquid crystal is used as a segment driving device, the output voltage is controlled by the three control signals based on an input/output table of a segment driver (SEG-Drv.) shown in FIG. 6. Hence, the correspondences between the segment control signals and the segment voltage waveforms illustrated in FIG. 4 are established.

The waveform of a common voltage for driving the bistable liquid crystal display panel 10 has the potential VCX, which does not appear during normal driving for the general STN liquid crystal, and hence a control signal for outputting the potential is expressed by CCX. When common output control is performed as shown in the column of the drive mode (Mode-C) in an input/output table of a common driver (COM-Drv.) shown in FIG. 7, the correspondences between the common control signals and the common voltage waveforms illustrated in FIG. 4 are established.

After the image is written into the bistable liquid crystal display panel 10 in the manner described above, even if the common voltage and the segment voltage are set to GND to put the bistable liquid crystal display panel 10 in a non-application state, the written display image is held. That is, even when power supply is turned off after image writing, the image on the bistable liquid crystal display panel 10 is displayed. Power is necessary for writing, but display after the writing can be performed with no power. This is the feature of the bistable liquid crystal display panel 10.

From the facts that the write waveform to the bistable liquid crystal display panel 10 contains a DC component as described above and that the liquid crystal molecules have not yet reached a stable state of anchoring force immediately after the end of writing but gradually become the stable state, it is considered that the charges still remain in liquid crystal even at the time point when the COM electrode and the SEG electrode have become GND.

The bistable liquid crystal display panel 10 has a structure in which liquid crystal is sandwiched by glass substrates, on each of which a transparent electrode, an insulating film, and an orientation film are formed in this order. The bistable liquid crystal display panel 10 has an equivalent circuit as illustrated in FIG. 5 when each film is regarded as a parallel circuit of a resistor and a capacitor. Further, a liquid crystal layer is also regarded as a parallel circuit of a resistor and a capacitor. In this case, the charges remaining in the liquid crystal layer after writing have two directions of discharge, that is, a direction of discharge to the transparent electrode side via the insulating film and the orientation film, and a direction of discharge by the resistance of the liquid crystal layer itself. However, the specific resistances of the insulating film, the orientation film, and the liquid crystal layer are so high that no current flows, and hence the charges remain for a relatively long time (several seconds to several minutes).

Further, when a positive DC voltage is applied to the COM electrode of the bistable liquid crystal display panel 10, the orientation film is broken in several hours even by about 1 V, and display cannot be performed. On the other hand, when a positive DC voltage is applied to the SEG electrode, ions are absorbed to the orientation film to change electrical characteristics. Therefore, although the residual charges resulting from single writing cause no problem because its period is short, the residual charges after writing break down the bistable liquid crystal display panel 10 as the number of rewriting increases.

CITATION LIST

Patent Literature

[PTL 1] JP 2004-4552 A

SUMMARY OF INVENTION

Technical Problem

The problem to be solved by the present invention is to increase the number of rewritable times of a bistable nematic dot-matrix liquid crystal display panel to enhance reliability.

Solution to Problem

In order to solve the above-mentioned problem, after the waveform for rewriting the bistable liquid crystal display panel 10 was applied, an AC waveform of a voltage lower than the last pulse of a drive waveform was applied. It is more effective to allow the voltage to gradually approach 0 V.

A current flowing through the parallel circuit of the resistor and the capacitor of the insulating film and the orientation film is expressed by the following expression.

$$I=\sqrt{(V/R)^2+(\omega CV)^2}=V\sqrt{(1/R)^2+(\omega C)^2} \quad \text{[Math. 1]}$$

In this case, if the films are dense and firm, R approaches infinity, and hence charges are not discharged from the resistive component side.

After writing, the COM electrode and the SEG electrode become GND to eliminate the AC component and an angular velocity $\omega$ is 0, and hence the charges are not discharged from the capacitive component side, either. When a small AC waveform is applied at this time, the angular velocity $\omega$ becomes finite, and the charges are discharged from the capacitive component side.

Advantageous Effects of Invention

In the case where no AC waveform was applied after writing in the conventional technology, the characteristics were changed after 10,000 times of continuous writing, and the display became faint. However, in the case where an AC waveform was applied after writing in the present invention, the characteristics were not changed even after 100,000 times of continuous writing, and the display quality was the same as the initial one.

BRIEF DESCRIPTION OF DRAWINGS

FIG. 7 is a truth table showing an input/output table of a common driver (COM-Drv.).

DESCRIPTION OF EMBODIMENTS

A method for improving reliability of a bistable liquid crystal display panel 10 according to the present invention may be implemented by changing a drive waveform without changing hardware of a device for driving the bistable liquid crystal display panel 10.

EXAMPLE 1

Figure 1:
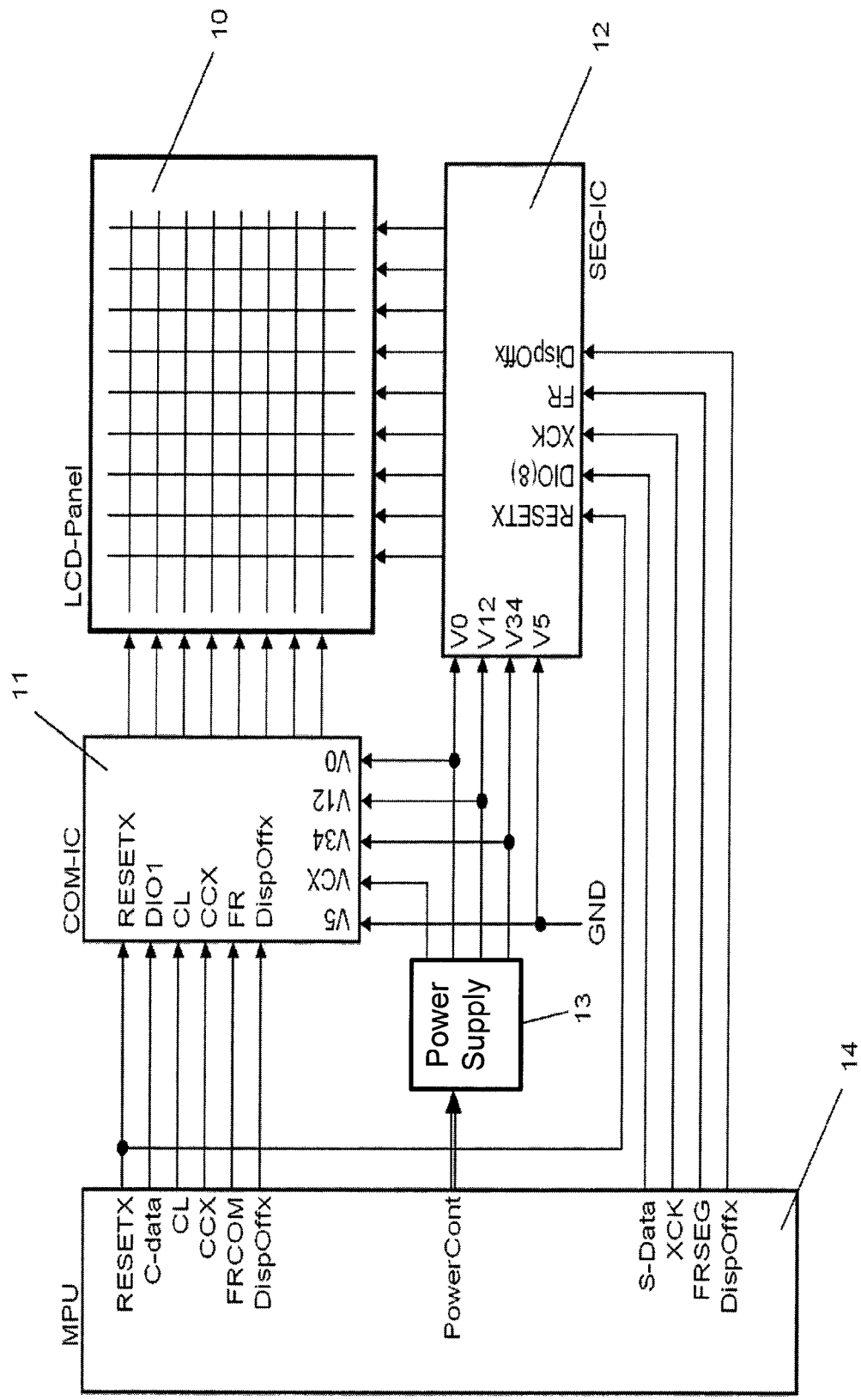
FIG. 1 is a general functional block diagram illustrating display control of a bistable liquid crystal display panel.
Figure 2:
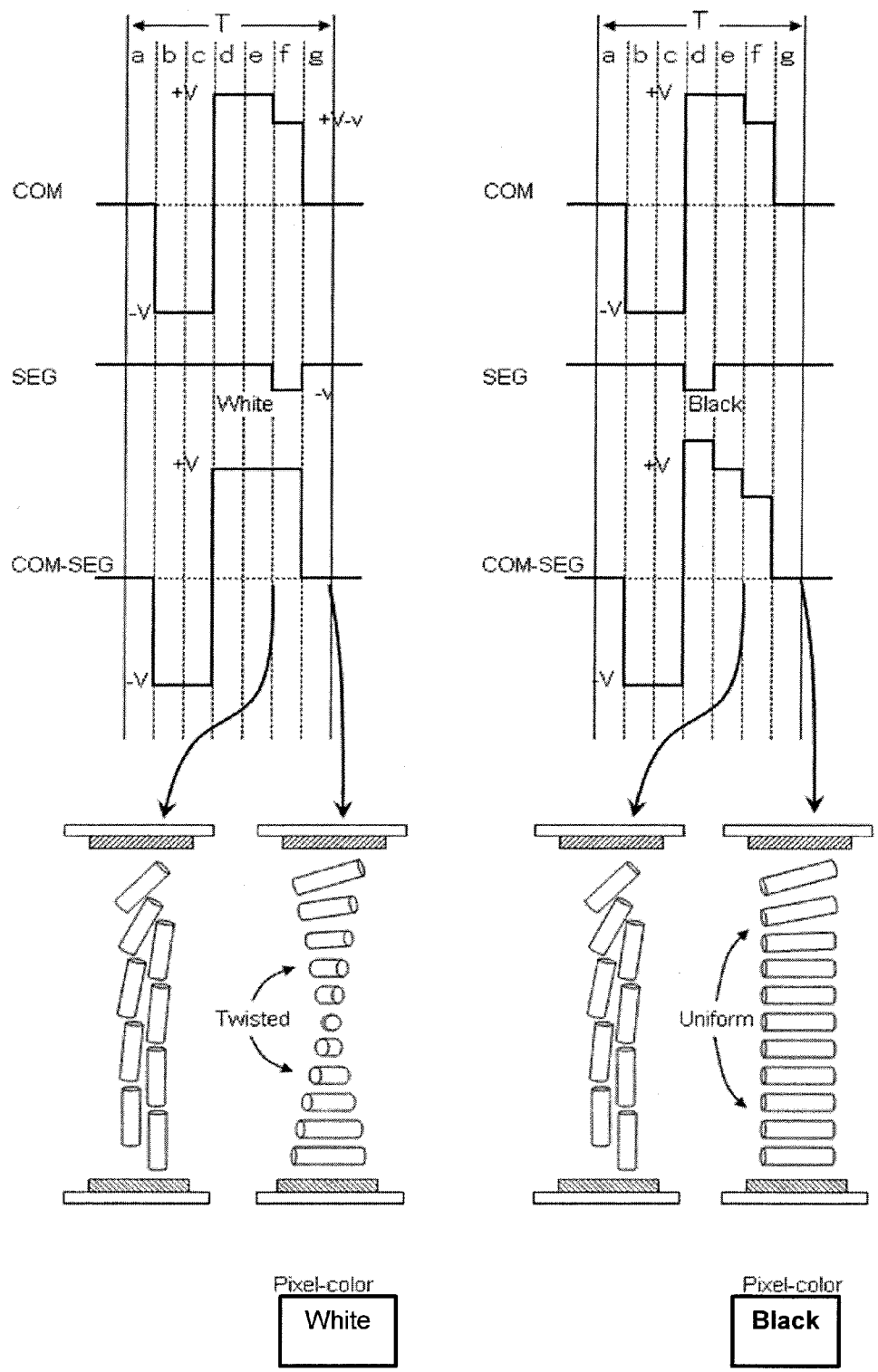
FIG. 2 is an explanatory diagram of switching of bistable liquid crystal, schematically illustrating how an intersection pixel displays white or black (Black) in response to respective waveforms of voltages applied to a common terminal and a segment terminal and a waveform of a common-segment voltage.
Figure 3:
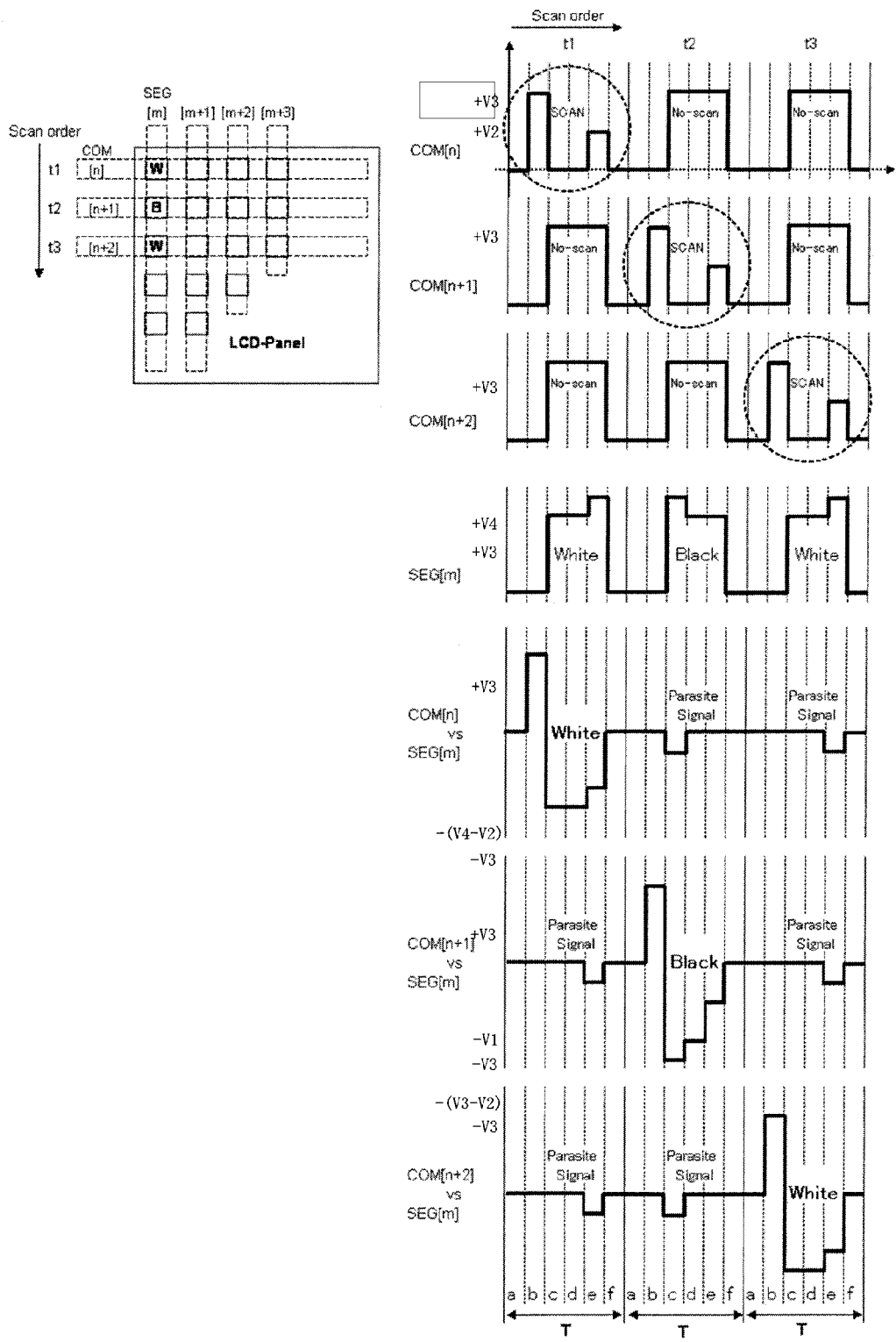
FIG. 3 is a diagram illustrating respective waveforms of voltages applied to the common terminal and the segment terminal and a waveform of the common-segment voltage of the bistable liquid crystal display panel.

The driving device to which a driving method according to the present invention is applied, that is, a driving device for a bistable nematic dot-matrix liquid crystal display panel, which is capable of selecting black/white only by positive polarity driving or negative polarity driving, has the same hardware configuration as a conventional one. That is, as illustrated in FIG. 1, the bistable liquid crystal display panel 10 is driven by the driving device including the common driving section (COM-IC) 11 for driving common lines in the horizontal direction, the segment driving section (SEG-IC) 12 for driving segment lines in the vertical direction, the power supply circuit 13 for generating drive potentials (V0, V12, V34, V5, and VCX), and the control section (MPU) 14 for controlling the common driving section 11, the segment driving section 12, and the power supply circuit 13.

The signals and functions of the control section 14 for controlling the common driving section 11 and the segment driving section 12 are the same as those in a normal STN driver circuit. For the common driving section 11, there are prepared the initialization signal RESETX, the C-data for determining scan timing, the writing clock CL, the alternating current signal FRCOM, and DispOffx for display erasing. For the segment driving section 12, there are prepared the initialization signal RESETX, S-data for providing the display image data, the writing clock XCK, the alternating current signal FRSEG, and DispOffx for display erasing. As a matter of course, the power supply circuit 13 maybe incorporated in the common driving section (COM-IC) 11 or the segment driving section (SEG-IC) 12 may be further incorporated therein, to thereby serve as a single IC.

Next, referring to FIGS. 8 to 11, a description is given of a method of driving a bistable nematic dot-matrix liquid crystal display panel at low temperature where a high voltage and a long pulse are applied. For easier understanding, the method of driving a bistable liquid crystal display panel according to the present invention is described in comparison with a conventional driving method.

Figure 8:
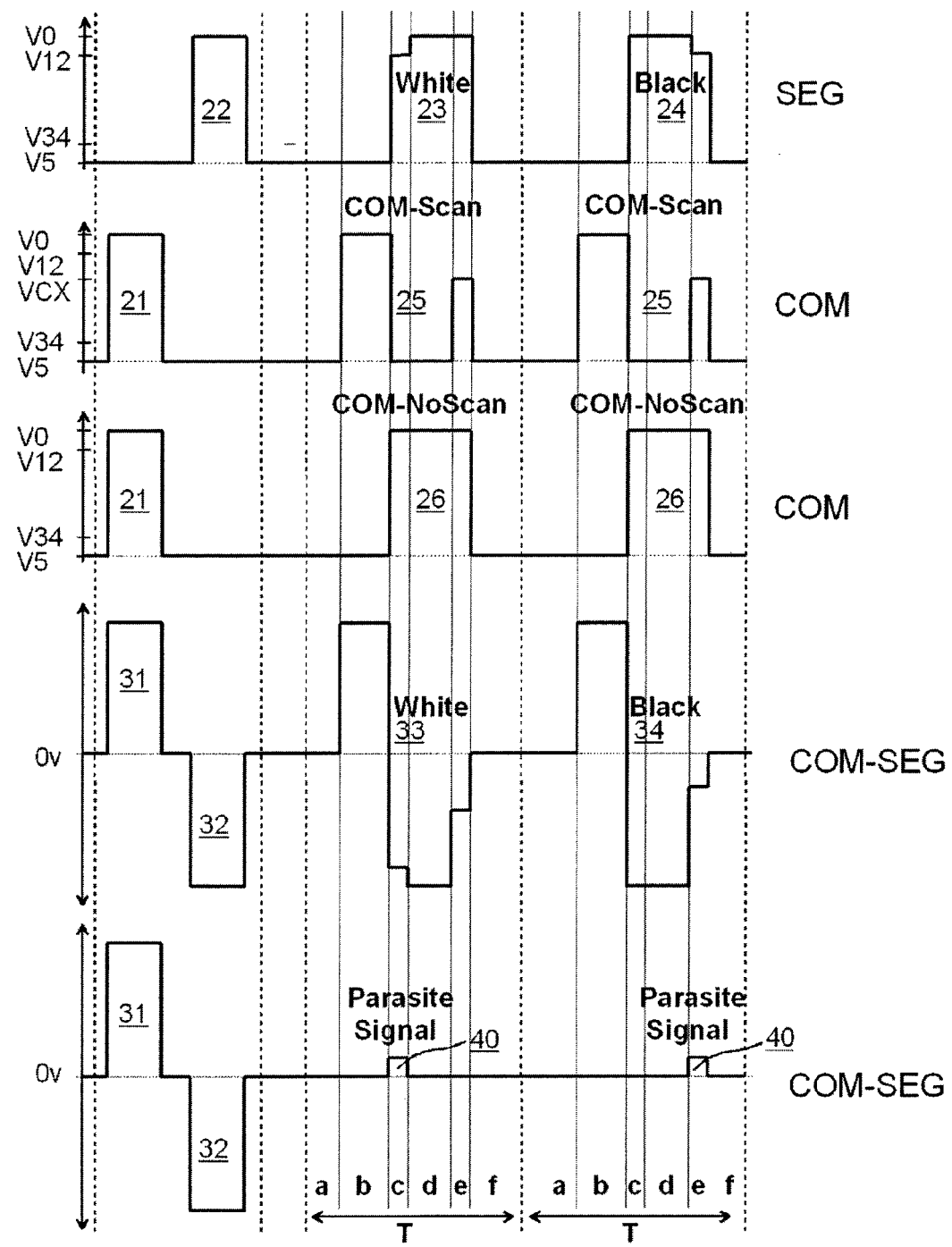
FIG. 8 is a diagram illustrating waveforms of the common-segment voltage of the bistable liquid crystal display panel driven in a conventional drive mode for low temperature.

FIG. 8 illustrates a conventional method of driving a bistable nematic dot-matrix liquid crystal display panel, which is capable of selecting black/white only by positive polarity driving or negative polarity driving and is appropriately designed so as to produce a maximum voltage pulse of a driver IC in a drive mode (Mode-G) suitable for low temperature. The voltage waveforms of FIG. 8 represent, in order from the top, a voltage waveform of a white write signal 23 and a black write signal 24 applied to a segment terminal, a voltage waveform of a selection signal 25 applied to a common terminal, a voltage waveform of a non-selection signal 26 applied to the common terminal, a voltage waveform of a white display voltage 33 and a black display voltage 34 as common-segment voltages at the time of selection, and a voltage waveform of a parasite signal 40 as a common-segment voltage at the time of non-selection.

The voltage waveform of the white write signal 23 is a waveform which has, as illustrated in the uppermost stage of FIG. 8, a positive level +V5 for the first time intervals "a" and "b" of a selection period T, a positive level +V12 for a subsequent time interval "c", a positive level +V0 for subsequent time intervals "d" and "e", and the positive level +V5 for the remaining time interval "f".

The voltage waveform of the black write signal 24 is a waveform which has, as illustrated in the uppermost stage of FIG. 8, the positive level +V5 for the first time intervals "a" and "b" of the selection period T, the positive level +V0 for the subsequent time intervals "c" and "d", the positive level +V12 for the subsequent time interval "e", and the positive level +V5 for the remaining time interval "f".

The voltage waveform of the selection signal 25 is a waveform which has, as illustrated in the second stage from the top of FIG. 8, the positive level +V5 for the first time interval "a" of the selection period T, the positive level +V0 for the subsequent time interval "b", the positive level +V5 for the subsequent time intervals "c" and "d", a positive level +VCX for the subsequent time interval "e", and the positive level +V5 for the remaining time interval "f".

The voltage waveform of the non-selection signal 26 is a waveform which has, as illustrated in the third stage from the top of FIG. 8, the positive level +V5 for the first time intervals "a" and "b" of the selection period T, the positive level +V0 for the subsequent time intervals "c" to "e", and the positive level +V5 for the remaining time interval "f".

When the above-mentioned voltages are applied to the common terminal and the segment terminal at the time of selection, the common-segment voltage between the common terminal and the segment terminal is as illustrated in the fourth stage from the top of FIG. 8. Note that, in the fourth stage from the top of FIG. 8, an erase pulse 31 is a rectangular wave of a positive level +5, and an erase pulse 32 applied subsequently is a rectangular wave of a negative level −5.

The white display voltage 33 obtained when the selection signal 25 and the white write signal 23 are applied is a voltage having a waveform which has the level of 0 for a time period of the first time interval "a" of the selection period T, the positive level +5 for a time period of the subsequent time interval "b", a negative level −4 for a time period of the subsequent time interval "c", the negative level −5 for a time period of the subsequent time interval "d", a negative level −3 for a time period of the subsequent time interval "e", and the positive level 0 for a time period of the remaining time interval "f".

Further, the black display voltage 34 obtained when the selection signal 25 and the black write signal 24 are applied is a voltage having a waveform which has the level of 0 for a time period of the first time interval "a" of the selection period T, the positive level +5 for a time period of the subsequent time interval "b", the negative level −5 for a time period of the subsequent time intervals "c" and "d", a negative level −2 for a time period of the subsequent time interval "e", and the level of 0 for a time period of the remaining time interval "f".

When the above-mentioned voltages are applied to the common terminal and the segment terminal at the time of non-selection, the common-segment voltage between the common terminal and the segment terminal is as illustrated in the lowermost stage of FIG. 8. Note that, in the lowermost stage of FIG. 8, an erase pulse 31 is a rectangular wave of the positive level +5, and an erase pulse 32 applied subsequently is a rectangular wave of the negative level −5.

When the non-selection signal 26 and the white write signal 23 are applied, the common-segment voltage is a voltage having a waveform which has the level of 0 for a time period of the first time intervals "a" and "b" of the selection period T, the positive level +1 for a time period of the subsequent time interval "c", and the level of 0 for a time period of the remaining time intervals "d" to "f". The above-mentioned rectangular pulse of the positive level +1 is the parasite signal 40.

When the non-selection signal 26 and the black write signal 24 are applied, the common-segment voltage is a voltage having a waveform which has the level of 0 for the first time intervals "a" to "d" of the selection period T, the positive level +1 for the subsequent time interval "e", and the level of 0 for the remaining time interval "f". The above-mentioned rectangular pulse of the positive level +1 is the parasite signal 40.

Figure 9:
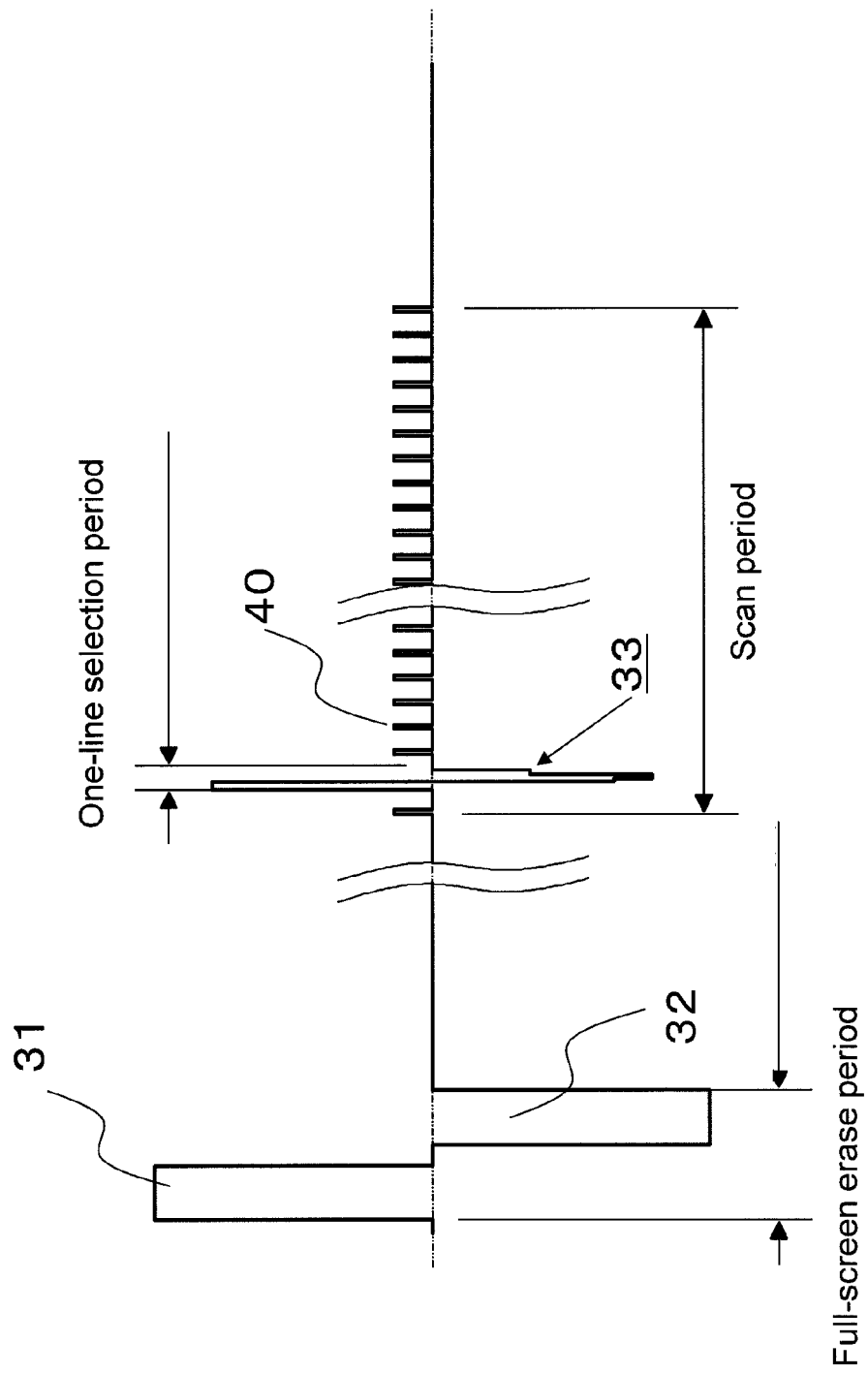
FIG. 9 is a waveform diagram for driving by a drive signal of a conventional selection waveform.

FIG. 9 is a diagram illustrating a waveform of the common-segment voltage of the bistable liquid crystal display panel when driven in the conventional drive mode of FIG. 8. As is apparent from FIG. 9, in the case of driving in the conventional drive mode, although the drive waveform is 0 V, the charges remain in a liquid crystal layer for a relatively long time after a full-screen erase period and after a scan period.

(Driving Method of the Present Invention)

Figure 10:
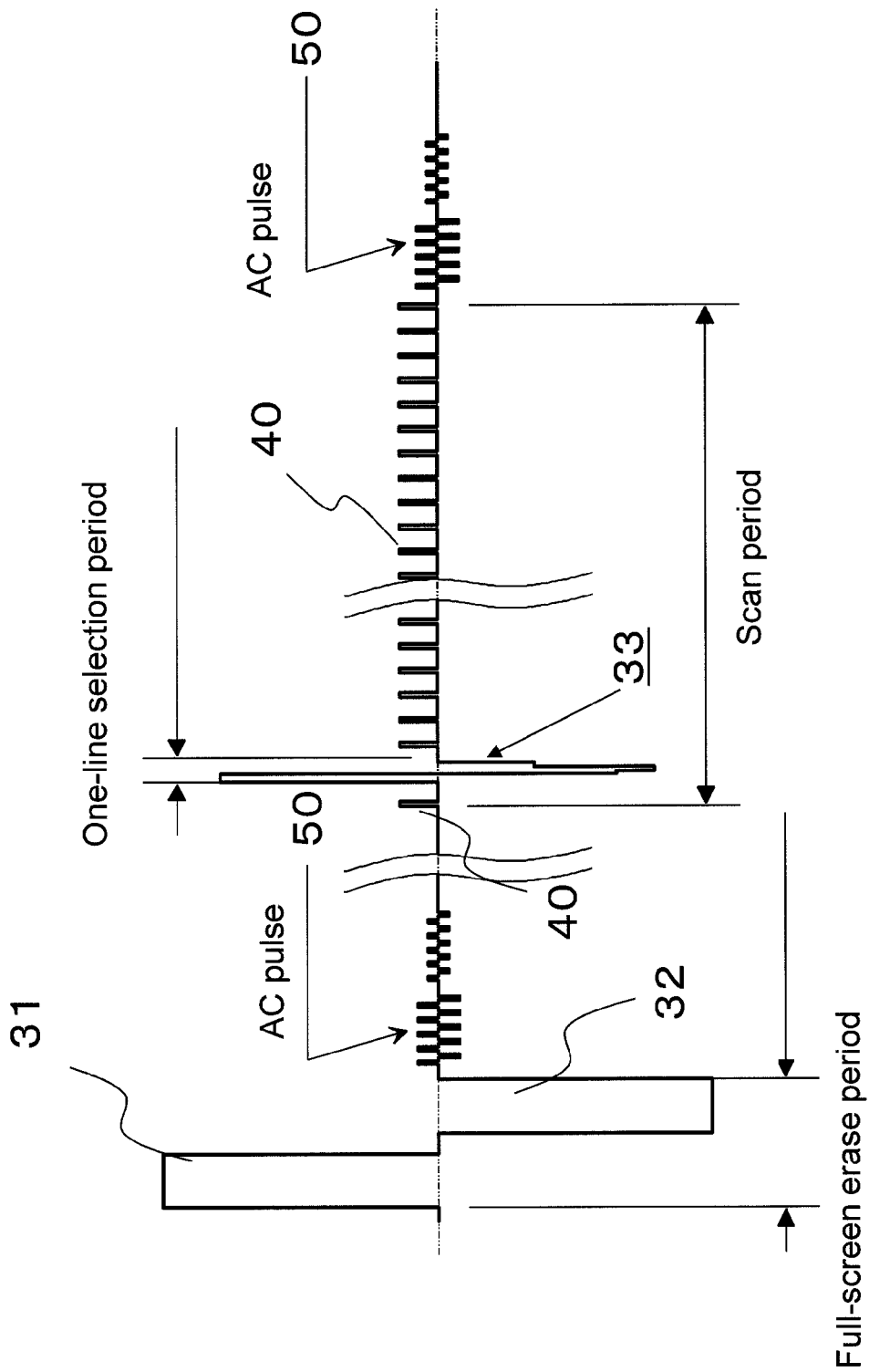
FIG. 10 is a waveform diagram for driving by a drive signal of a selection waveform according to Example 1 of the present invention.
Figure 11:
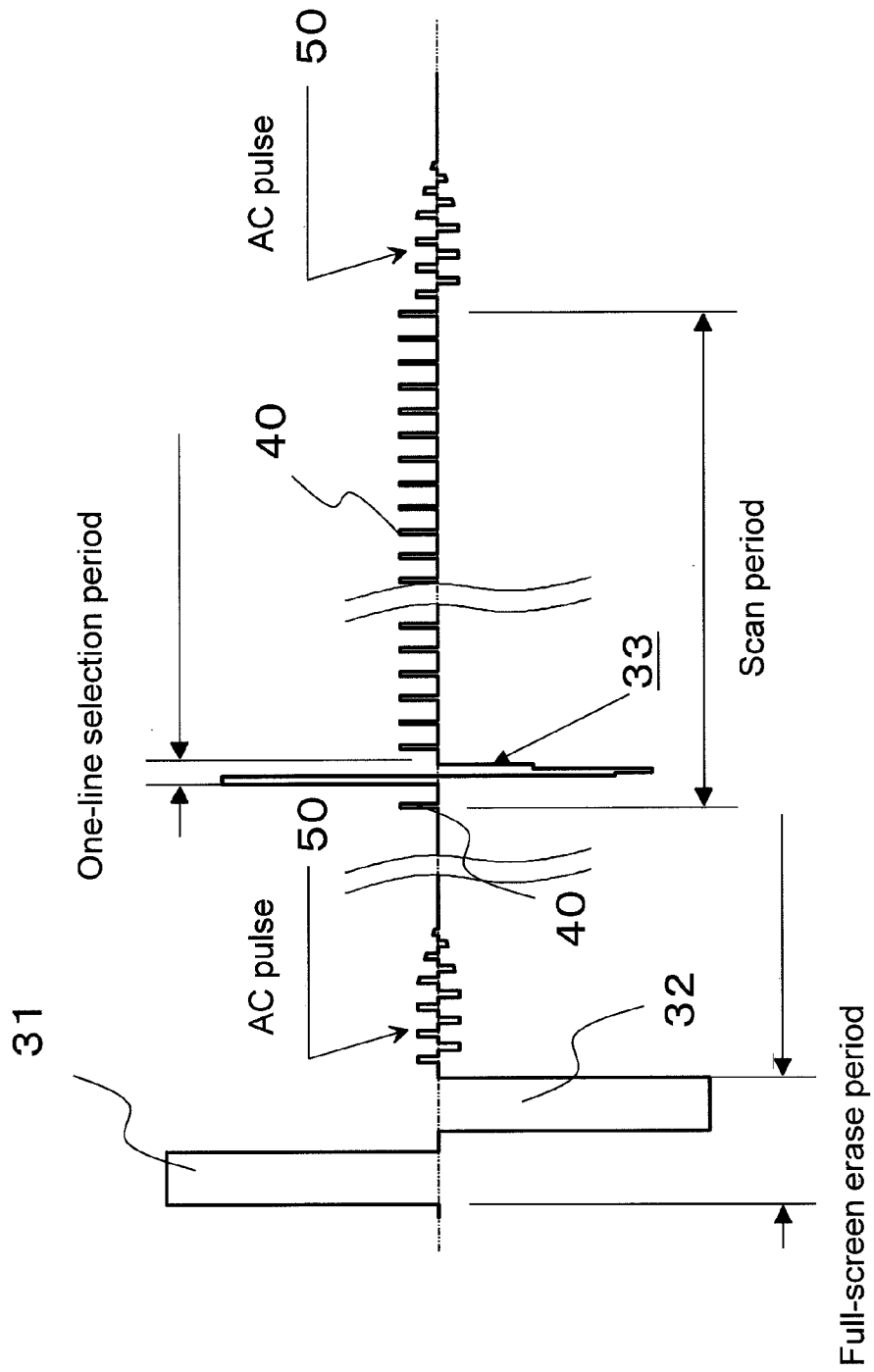
FIG. 11 is a waveform diagram for driving by a drive signal of a selection waveform according to Example 2 of the present invention.

Next, referring to FIGS. 10 and 11, a description is given of a driving method in which a low voltage AC waveform is added to the voltage waveform of FIG. 9 driven by the conventional drive mode (Mode-G) of FIG. 8.

Figure 4:
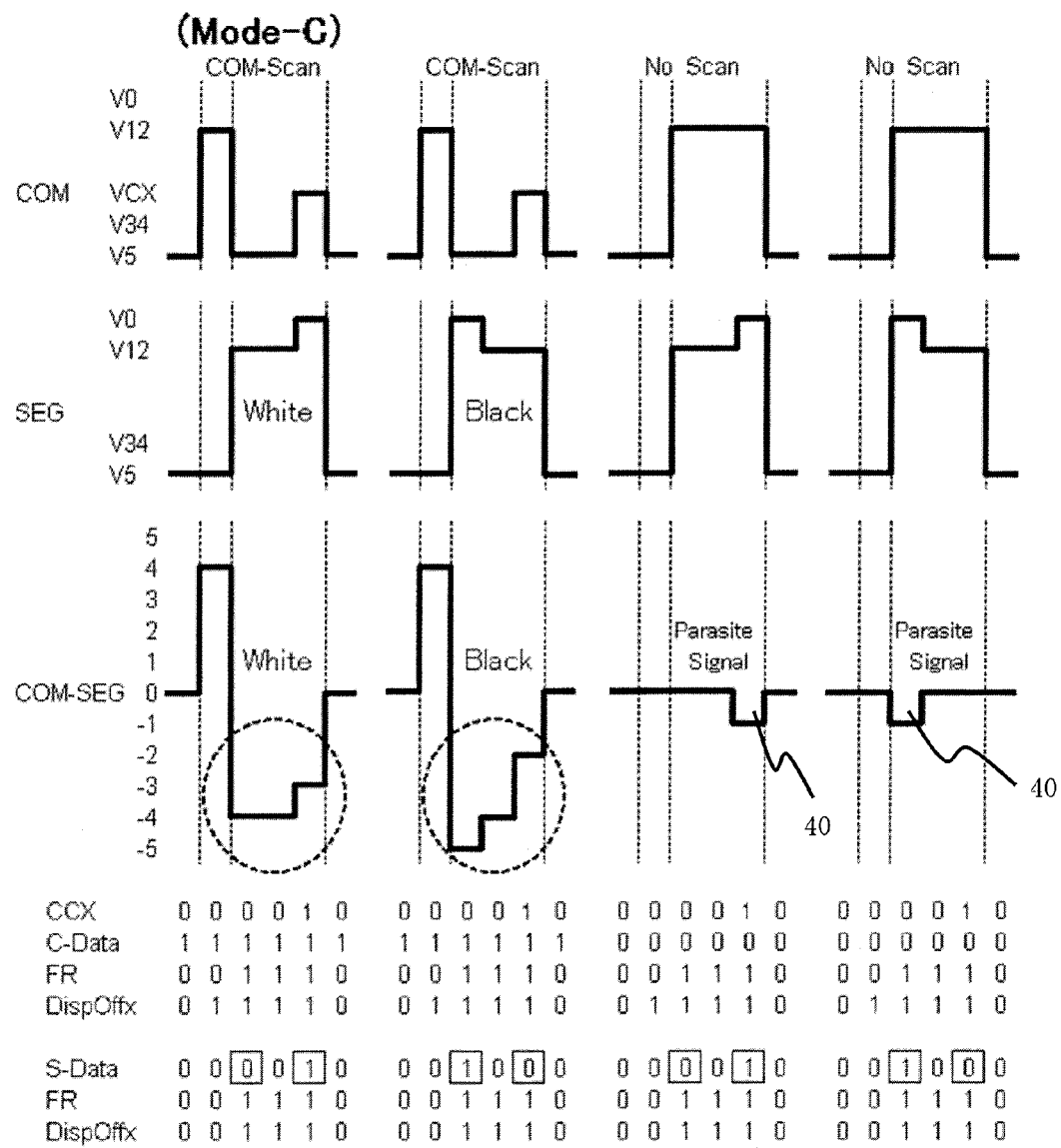
FIG. 4 is a diagram illustrating a method of driving a bistable nematic dot-matrix liquid crystal display panel, illustrating waveforms of a common voltage, a segment voltage, and a common-segment voltage in a drive mode (Mode-C).
Figures 5, 6:
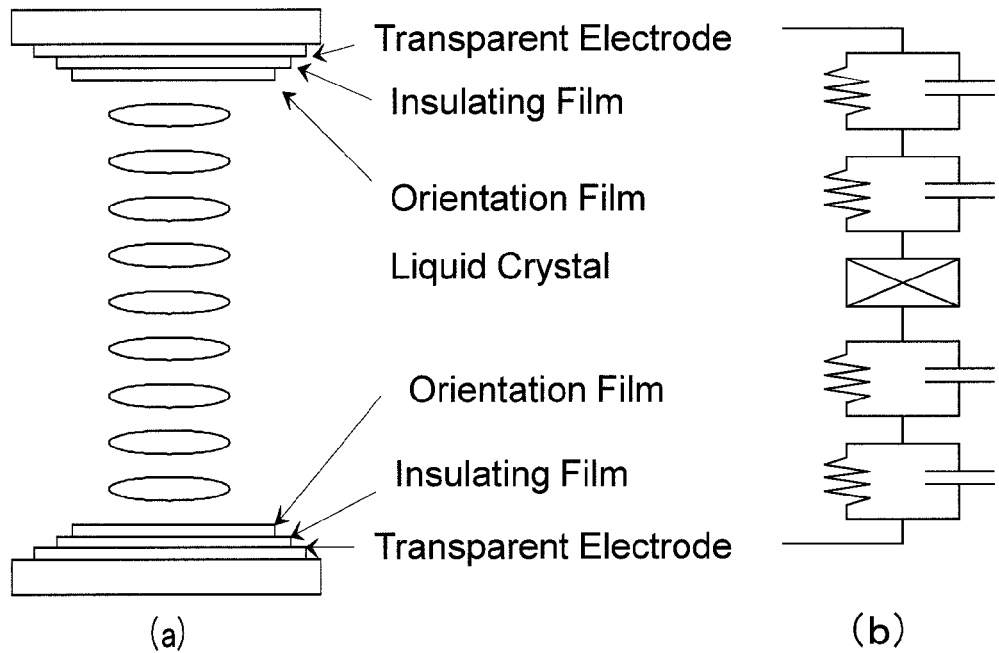
FIG. 5 is a diagram illustrating a structure and an equivalent circuit of the bistable liquid crystal display panel.
FIG. 6 is a truth table showing an input/output table of a segment driver (SEG-Drv.).

In FIG. 10, the same waveform as in the conventional drive mode (Mode-G) was used in each of the full-erase period and the scan period, and immediately thereafter, an AC rectangular wave was added. The AC rectangular wave was added with the use of the parasite signal 40 on the negative side in the drive mode (Mode-C) of FIG. 4 and the parasite signal 40 on the positive side in the drive mode (Mode-G) of FIG. 8.

In this example, the AC rectangular wave whose voltage value was set to half the parasite signal 40 of the scan period was added for 5 cycles, and after a break period of 2 ms, the AC rectangular wave whose voltage value was set to ¼ was added for 5 cycles. The pulse width was the same as the parasite signal 40, but the frequency was increased. With this, also in a liquid crystal panel in which an insulating film is dense and liquid crystal and a transparent electrode are completely insulated from each other, the bistable liquid crystal display panel 10 can maintain the initial display quality by the drive waveform of the present invention even after 100,000 times of rewriting, though a display image thereof became faint by the conventional waveform when the number of rewritable times was about 10,000.

EXAMPLE 2

In FIG. 11, the same waveform as in the conventional drive mode (Mode-G) was used in each of the full-erase period and the scan period, and immediately thereafter, an AC rectangular wave was added. The AC rectangular wave was applied with the use of the parasite signal 40 on the negative side in the drive mode (Mode-C) of FIG. 4 and the parasite signal 40 on the positive side in the drive mode (Mode-G) of FIG. 8.

In this example, the AC rectangular wave whose voltage value was set to half the parasite signal 40 of the scan period was applied for several cycles, and after that, the AC rectangular wave was applied at the same timing so that the voltage value gradually approached 0 V by turning OFF the LCD power supply 13. The pulse width was the same as the parasite signal 40, but the frequency was increased. With this, also in the liquid crystal panel in which the insulating film is dense and the liquid crystal and the transparent electrode are completely insulated from each other, the initial display quality can be maintained by the drive waveform of the present invention even after 100,000 times of rewriting, though a display image thereof became faint by the conventional waveform when the number of rewritable times was about 10,000 because the characteristics of the liquid crystal panel were changed.

Further, it is sufficient that the waveform to be applied is a low voltage AC, and hence there is no need to stick to a rectangular wave. Similar effects can be obtained even by other waveforms.

Still further, the period for applying the AC rectangular wave needs to be changed depending on the characteristics of the liquid crystal panel. In the case where the insulating film and the orientation film are dense and have high insulating property, the period may be long. In the case where the insulating film and the orientation film are coarse and have low insulating property, the period may be short. In addition, the voltage values and the pulse widths of the full-erase period and the scan period change depending on temperature. At low temperature in particular, the voltage and the pulse width are both increased, and hence the period for applying the AC rectangular wave needs to be lengthened as well.

According to the present invention, in the driving device for a bistable nematic dot-matrix liquid crystal display panel, the reliability can be improved without greatly changing the conventional driving device for a bistable nematic dot-matrix liquid crystal display panel.

REFERENCE SIGNS LIST 10 bistable liquid crystal display panel
11 common driving section (COM-IC)
12 segment driving section (SEG-IC)
13 power supply section
14 control section (MPU)
21 signal applied to all common terminals
22 signal applied to all segment terminals
23 white write signal
24 black write signal
25 selection signal
26 non-selection signal
31 common-segment voltage waveform
32 common-segment voltage waveform
33 black display voltage
34 white display voltage
40 parasite signal
50 AC rectangular pulse
COM common signal
COM-Scan selection signal
COM-No Scan non-selection signal
SEG segment signal
COM-SEG common-segment voltage or display voltage

The invention claimed is:

1. A method of driving a bistable nematic dot-matrix liquid crystal display panel capable of selecting black/white only by positive polarity driving or negative polarity driving, the method comprising:
 applying a first pulse voltage to nematic liquid crystal molecules of the bistable nematic dot-matrix liquid crystal display panel to raise the nematic liquid crystal molecules in the longitudinal direction;
 after application of the first pulse voltage, applying a second pulse voltage to the nematic liquid crystal molecules for selecting one of two stable orientation states of the nematic liquid crystal molecules; and
 immediately after application of the second pulse voltage, applying an AC pulse waveform of a voltage lower than a last pulse of the second pulse voltage to thereby remove residual electric charges remaining in the bistable nematic dot-matrix liquid crystal display panel.

2. A method of driving a bistable nematic dot-matrix liquid crystal display panel according to claim 1, wherein the AC pulse waveform is a rectangular AC pulse waveform.

3. A method of driving a bistable nematic dot-matrix liquid crystal display panel according to claim 1, wherein the applying of the AC pulse waveform comprises changing a voltage, a pulse width, or a number of pulses of the AC pulse waveform depending on temperature.

4. A method of driving a bistable nematic dot-matrix liquid crystal display panel according to claim 1, wherein the applying of the AC pulse waveform comprises gradually changing a voltage of the AC pulse waveform to be 0 V.

5. A device for driving a bistable nematic dot-matrix liquid crystal display panel capable of selecting black/white only by positive polarity driving or negative polarity driving, the device comprising:
 a common driving section for driving common lines in the horizontal direction;
 a segment driving section for driving segment lines in the vertical direction;
 a power supply circuit for generating drive potentials; and
 a control section for controlling the common driving section, the segment driving section, and the power supply circuit to apply a first pulse voltage to nematic liquid crystal molecules of the bistable nematic dot-matrix liquid crystal display panel to raise the nematic liquid crystal molecules in the longitudinal direction, apply a second pulse voltage to the nematic liquid crystal molecules for selecting one of two stable orientation states of the nematic liquid crystal molecules, and immediately thereafter apply an AC pulse waveform of a voltage lower than a last pulse of the second pulse voltage to thereby remove charges remaining in the bistable nematic dot-matrix liquid crystal display panel.

6. A device for driving a bistable nematic dot-matrix liquid crystal display panel according to claim 5, wherein the AC pulse waveform is a rectangular AC pulse waveform.

7. A device for driving a bistable nematic dot-matrix liquid crystal display panel according to claim 5, wherein the control section further controls the common driving section, the segment driving section, and the power supply circuit to change a voltage, a pulse width, or a number of pulses of the AC pulse waveform depending on temperature.

8. A device for driving a bistable nematic dot-matrix liquid crystal display panel according to claim 5, wherein the control section controls the common driving section, the segment driving section, and the power supply circuit so that a voltage of the AC pulse waveform is gradually changed to be 0 V.

9. A method of driving a bistable nematic dot-matrix liquid crystal display panel capable of selecting black/white only by positive polarity driving or negative polarity driving, the method comprising:
 applying a first pulse voltage to nematic liquid crystal molecules of the bistable nematic dot-matrix liquid crystal display panel to raise the nematic liquid crystal molecules in the longitudinal direction;
 after application of the first pulse voltage, applying a second pulse voltage to the nematic liquid crystal molecules for selecting one of two stable orientation states of the nematic liquid crystal molecules; and
 immediately after application of the second pulse voltage, applying a cancel AC pulse waveform with a gradual decrease in voltage to remove a parasite signal.

10. A method of driving a bistable nematic dot-matrix liquid crystal display panel according to claim 9, wherein the cancel AC pulse waveform is a rectangular cancel AC pulse waveform.

11. A method of driving a bistable nematic dot-matrix liquid crystal display panel according to claim 9, wherein the applying of the cancel AC pulse waveform comprises changing a voltage, a pulse width, or a number of pulses of the cancel AC pulse waveform depending on temperature.

12. A method of driving a bistable nematic dot-matrix liquid crystal display panel according to claim 9, wherein the voltage of the cancel AC pulse waveform is gradually decreased to 0 V.

13. A method of driving a bistable nematic dot-matrix liquid crystal display panel according to claim 9, wherein the cancel AC pulse waveform is a low voltage cancel AC pulse waveform.

* * * * *